[19] Thompson et al.

[11] Patent Number: 4,855,411
[45] Date of Patent: Aug. 8, 1989

[54] WATER-SOLUBLE, MONOAZO DYES CONTAINING A UREIDO GROUP AND TWO SULFONYL FIBER-REACTIVE GROUPS

[75] Inventors: Glenn A. Thompson, Hopkinton; Anthony J. Corso, Coventry, both of R.I.; Hans H. Steuernagel, Kelkheim, Fed. Rep. of Germany

[73] Assignees: Hugh C. Crall; Hoechst Celanese Corp., both of Somerville, N.J.

[21] Appl. No.: 170,585

[22] Filed: Mar. 17, 1988

[51] Int. Cl.$^4$ .................... C09B 62/51; C09B 62/515; D06P 1/38; D06P 3/66
[52] U.S. Cl. ................................. 534/629; 534/582; 534/602; 534/642; 534/887; 562/49
[58] Field of Search .................... 534/641, 642, 629

[56] References Cited

U.S. PATENT DOCUMENTS

| | | | |
|---|---|---|---|
| 2,657,205 | 10/1953 | Heyna et al. | 534/642 X |
| 2,784,204 | 3/1957 | Heyna et al. | 534/642 X |
| 3,086,967 | 4/1963 | Davies et al. | 534/642 X |
| 3,223,470 | 12/1965 | Boedeker et al. | 534/638 X |
| 3,364,194 | 1/1968 | Meininger et al. | 534/642 X |
| 3,380,989 | 4/1968 | Remy | 534/642 X |
| 3,419,542 | 12/1968 | Meininger et al. | 534/642 X |
| 3,450,689 | 6/1969 | Langbein et al. | 534/642 X |
| 3,457,251 | 7/1969 | Meininger et al. | 534/642 X |
| 3,518,245 | 6/1970 | Meininger et al. | 534/642 X |
| 3,519,616 | 7/1970 | Bauer et al. | 534/642 X |
| 3,655,642 | 4/1972 | Meininger et al. | 534/642 X |
| 4,046,754 | 9/1977 | Meininger et al. | 534/642 |
| 4,139,527 | 2/1979 | Meininger et al. | 534/642 X |

Primary Examiner—Floyd D. Higel
Attorney, Agent, or Firm—Hugh C. Crall

[57] ABSTRACT

This invention is directed to new water-soluble, monoazo dyes having the following general formula:

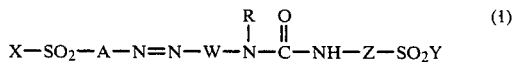

(1)

in which: X and Y are independently selected from the group consisting of:

$-CH=CH_2$, $-CH_2CH_2S-SO_3H$, $-CH_2CH_2Br$, $-CH_2CH_2OCOCH_3$, $-CH_2CH_2OH$, $-CH_2CH_2OPO_3H_2$,

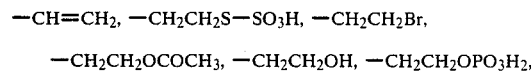

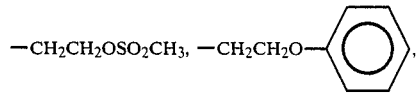

$-CH_2CH_2-NR_1R_2$;

R, $R_1$, $R_2$ are independently selected from H, lower alkyl of one to four carbons and sulfonated lower alkyl;
A is a phenyl or napthyl radical optionally substituted with halogen, hydroxy, lower alkyl, lower alkoxy, carboxylic acid or sulfonic acid;
W is a phenyl or naphthyl radical optionally substituted by carboxylic acid, sulfonic acid, amino, amido, lower alkyl, lower alkoxy, hydroxy or halogen groups;
Z is a phenyl radical optionally substituted with halogen, lower alkoxy or lower alkyl groups; and
copper, chromium, cobalt and nickel metallized complexes of said dyestuffs.

The dyes of this invention on cellulose textiles have high tinctorial strength, purity of shade, light and wash fastness particularly chlorine wash fastness. They are particularly useful in high temperature dyeing operations and can be prepared into stable aqueous solutions for use in continuous dyeing operations. The dyes of this invention provide a full range of shades and exhibit superior color yield and leveling in chemical pad steaming dyeing. They build strongly with superior fixation and have superior stability in acidic and alkaline environments.

21 Claims, No Drawings

WATER-SOLUBLE, MONOAZO DYES CONTAINING A UREIDO GROUP AND TWO SULFONYL FIBER-REACTIVE GROUPS

CROSS REFERENCE TO RELATED APPLICATIONS

This Application is a continuation of U.S. patent application Ser. No. 923,356, filed Oct. 27, 1986, now abandoned.

BACKGROUND OF THE INVENTION

This invention is directed to the field of water-soluble, fiber-reactive, monoazo dyes. The dyes of the invention contain two fiber-reactive, sulfonyl groups and are characterized by (1) a non-chromophoric, linking, ureido group separating and insulating one of the fiber-reactive groups from the chromophore and (2) at least one fiber-reactive group being substituted on the diazo component and one of the coupler component.

U.S. Pat. No. 3,419,542 and 3,518,245 disclose monoazo dyes containing a ureido group and their metal complexes. These compounds having one reactive, sulfonyl group substituted on a phenyl group which is linked to the naphthalene coupler by a ureido group; (i.e., coupler-ureido-phenyl-reactive group).

U.S. Pat. No. 3,655,642 and EP No. 107,614 disclose monoazo dyes with two reactive, sulfonyl groups; both of which are substituted on the diazo component. Also, known as disazo dyes (see U.S. Pat. Nos. 2,657,205; 3,364,194) which contain two diazo moieties and two reactive groups; such disazo dyes are limited in that they do not produce a full range of shades; only blue and brown.

U.S. Pat. No. 3,519,616 discloses monoazo, water-soluble, fiber-reactive dyes with two reactive, sulfonyl groups; one of each being linked to the coupler and one to the diazo component. No specific example is disclosed but at Column 3, illustrative couplers and diazo components are given in which certain examples of each contain a fiber-reative group. The fiber-reactive groups, however, are not separated from the chromophore by a non-chromophoric insulating group. Similarly, U.S. Pat. No. 4,139,527 discloses certain fiber-reactive, monoazo dyes containing one or two acid monoesters but as in the '616 patent none of these reactive groups are separated from the chromophore by an insulating ureido group.

U.S Pat. No. 3,223,470 discloses monoazo dyes containing one fiber-reactive sulfonyl group and one fiber-reactive chlorotriazine group. These mixed dyes are not stable in acidic environment and are not readily discharged in printing applications. Although U.S. Pat. No. 3,223,470 discloses dyes in which both reactive groups are positioned on one side of the chromophore, mixed vinyl sulfonic triazine compounds are known wherein the fiber-reactive groups are positioned on opposite sides of the chromophore.

SUMMARY OF THE INVENTION

This invention is that of new monoazo dues and their metal complexes. These dyes in their metal-free form have the following general formula (1):

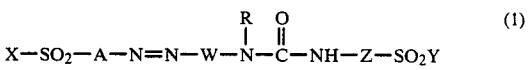

where:
X and Y are independently selected from:

$-CH=CH_2$, $-CH_2CH_2S-SO_3H$, $-CH_2CH_2Br$, $-CH_2CH_2OCOCH_3$, $-CH_2CH_2OH$, $-CH_2CH_2OPO_3H_2$,

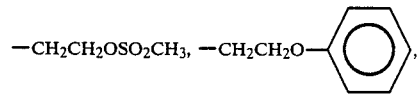

$-CH_2CH_2OSO_3H$, $-CH_2CH_2Cl$,

R, $R_1$, and $R_2$ are indpendently selected from hydrogen, lower alkyl of one to four carbon and sulfonated lower alkyl;

A is a phenyl or napthyl radical optionally substituted with hydroxy, halogen, lower alkyl, lower alkoxy, carboxylic acid, or sulfonic acid groups;

W is a phenyl or naphthyl radical optionally substituted with carboxylic acid, sulfonic acid, amono, amido, lower alkyl, lower alkoxy, hydroxy or halogen groups;

Z is a phenyl radical optionally substituted with halogen, lower alkoxy or lower alkyl groups.

The metal complexes of the dyes of the general formula (1) can be prepared by known methods if the dye contains in the ortho positions to the diazo group, a substitutent capable of forming metal complexes or of being capable of being converted to such a group; e.g. hydroxy, carboxyl and alkoxy. Suitable metals are copper, nickel, chromium or cobalt; preferably copper.

The dyes of general formula (1) contain two sulfonyl, fiber-reactive groups $SO_2X$ and $SO_2Y$ positioned on opposite sides of the dye molecule with the group Y being separated from the chromophore by a ureido group. The dyes of general formula (1) provide practically a full range of colors from golden yellow to blue and adapted to be chemically bonded at each end of the molecule to a substrate.

Although dyes containing a single, sulfonyl-reactive group exhibit high color yield loss with increasing dyeing temperature, the dyes of this invention do not. This advantage is unexpected and provides a means to obtain better leveling of the color by the use of high temperature, exhaust dyeing techniques. High dyeing temperatures effects dissolution of waxes from the fabric and the ability to withstand high temperature without color loss makes the dyes of this invention particularly suited for one-pot processing of unscoured fabrics with the attendant advantages of reduced dyeing time and effluent.

In chemical pad steam (C.P.S.) dyeings, the new dyes of the inveniton build strongly with high fixation. The percent fixation is equivalent or superior to that of dyes containing mixed monochlorotriazine/sulfonyl reactive groups. It has been found that each sulfonyl reactive group of the dyes of the invention contribute approximately equally to the dye fixation value. In contrast, the monochlorotriazine group of the mixed triazine/sulfonyl dyes contributes only about 15% (see: *Dyes and Pigments*, Vol. 3, page 290 (1982)).

Additional advantages of the dyes of this invention are (1) stability in acidic environment—mixed triazines/sulfonyl dyes hydrolyze resulting in color loss on washing after storage in acidic environments, (2) the sulfonyl reactive group is dischargeable whereas the triazine group is not, (3) the double sulfonyl reactive group dyes of the invention are more hydrolysis resistant in alkali medium than the mixed triazine/sulfonyl or single sulfonyl dyes group; (4) color loss and/or color change due to thermal cracking is reduced by double anchoring of the dye to fiber and insulating the chromophore from the second sulfonyl reactive group by the ureido group; i.e. no or little colors loss occur if the dye thermally cracks because the chromophore remains attached to the fiber. (5) These dyes may be prepared as liquid compositions which exhibit excellent long term storage stability; which is particularly useful in C.P.S. dyeing applications.

DESCRIPTION OF THE PREFERRED EMBODIMENTS

The dyes of the present invention in their non-metallized form are represented by the general formula (1):

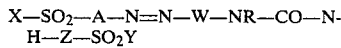

wherein X, A, W, R, Z and Y are as previously defined. The new dyes of this invention and their metal complexes can be prepared by known methods.

The new dyes are advantageously prepared by diazotization of amines of formula (2): $X-SO_2-A-NH_2$; which are then reacted with couplers of formula

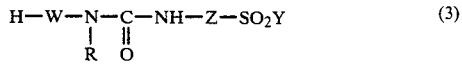

where X, Y, A, W, R and Z are as previously stated.

The diazotizations are carried out by known methods; by treatment of the amine with sodium nitrite in the presence of mineral acids or by treatment with nitrosyl sulfuric acid.

The following amines are examples of diazotizable amines ($X-SO_2-A-NH_2$) used in the practice of this invention:

1-amino-phenyl-2- or 3- or 4-beta-sulfatoethyl sulfone; 1-amino-2-carboxy phenyl-5-beta-sulfatoethyl sulfone; 1-amino-2-chlorophenyl-3-or 4-beta-sulfatoethyl sulfone; 1-amino-2-ethoxy phenyl-4- or 5-beta-sulfatoethyl sulfone; 1-amino-2-ethyl phenyl-4-beta-sulfatoethyl sulfone; 1-amino-2-methoxy phenyl-5-beta-sulfatoethyl sulfone; 1-amino-2,4-diethoxy phenyl-5-beta-sulfatoethyl sulfone; 1-amino-2,4-dimethoxy phenyl-5-beta-sulfatoethyl sulfone; 1-amino-2,5-dimethoxy phenyl-4-beta-sulfatoethyl sulfone; 1-amino-2-methoxy-5-methyl phenyl-4-beta-sulfatoethyl sulfone; 1-amino phenyl-2- or 3- or 4-beta-thiosulfatoethyl sulfone; 1-amino-2-methoxy phenyl-5-beta-thiosulfatoethyl sulfone; 1-amino-2-sulfonphenyl-4-beta-phosphatoethyl sulfone; 1-amino-2-sulfo phenyl-4-vinyl sulfone; 1-amino-2-hydroxy phenyl-4- or 5-beta-sulfatoethyl sulfone; 1-amino-2-hydroxy-3-sulfo phenyl-5-beta-sulfato ethyl sulfone; 1-amino-2-chloro phenyl-4- or 5-beta-chloroethyl sulfone; 1-amino phenyl-3- or 4-beta-acetoxyethyl sulfone; 1-amino-2-methoxy phenyl-4-beta-(N-methyl taurine) ethyl sulfone; 2-amino-5- or 6- or 7- or 8-beta sulfatoethyl sulfonyl-naphthalene; 2-amino-6-beta-sulfatoethyl sulfonyl-naphthalene-1- sulfonic acid; 2-amino-5-beta-sulfatoethyl sulfonyl-naphthalene-1 sulfonic acid; 2-amino-8-beta-sulfatoethyl sulfonyl-naphthalene-6-sulfonic acid.

Couplers of general formula (3) are conveniently produced by the condensation of an aromatic isocyanate of general formula (4): $Y-SO_2-Z-NCO$, or an aromatic carbamic acid derivative of general formula (5):

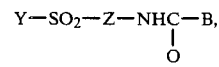

where B is chloro or a phenoxy group, with aromatic amines of general formula (6): $H-W-NHR$.

The following isocyanates of general formula (4) are examples which may be used in this invention:

3- or 4-(beta-chloroethyl sulfonyl)-phenyl-isocyanate; 2-methoxy-5-(beta-chloroethyl sulfonyl)-phenyl-isocyanate; 3- or 4-(beta acetoxyethyl sulfonyl)-phenyl-isocyanate; 3- or 4-(beta phenoxyethyl sulfonyl)-phenyl-isocyanate; 2,5-dimethoxy-4-(beta-chloroethyl sulfonyl)-phenyl-isocyanate; 3- or 4-vinylsulfonyl-phenyl-isocyanate; 2-chloro-3- or 4-(beta-chloroethyl sulfonyl)-phenyl-isocyanate.

The following compounds are examples of carbamic acid derivatives of formula (5) that may be used in this invention:

N-[4-(beta-sulfatoethyl sulfonyl)-phenyl]-carbamic acid phenyl ester; N-[4-(beta-phosphatoethyl sulfonyl)-phenyl]-carbamic acid phenyl ester; N-[2-methoxy-5-(beta-sulfatoethyl sulfonyl)-phenyl]-carbamic acid phenyl ester; N-[2-chloro-4-(beta-sulfatoethyl sulfonyl)-phenyl]-carbamic acid phenyl ester.

The following compounds are examples of couplers ($H-W-NHR$) that can be condensed with the substituted aromatic isocyanates or carbamic acid derivatives of general formula (4) and (5):

2-sulfo-5-acetamino-aniline; 3-Bromo aniline; 3-Chloro aniline; 3-methyl aniline; 3-ethyl aniline; 3-carbonamidoethyl-6-methoxy-aniline; 2,5-dimethoxy aniline; 2-amino-8-hydroxy-naphthalene-6-sulfonic acid; 3-amino-8-hydroxy-naphthalene-6-sulfonic acid; 1-amino-8-hydroxy-naphthalene-4-sulfonic acid; 1-amino-8-hydroxy-naphthalene-3,6-sulfonic acid; 1-amino-8-hydroxy-naphthalene-4,6-disulfonic acid; 2-amino-5-hydroxy-naphthalene-1,7-disulfonic acid; 1-amino-5-hydroxy-naphthalene-7-sulfonic acid; 1-amino-5-hydroxy-naphthalene-3,7-disulfonic acid; and derivatives of these compounds derived from mono alkylation of the nitrogen such as 2-(N-methylamino)-8-hydroxy-naphthalene-3,6-disulfonic acid.

As used in this description, lower alkyl or lower alkoxy means a 1 to 4 carbon atom moiety. Although the above description details a specific method for the preparation of the metal-free dyes of this invention, it is known by those skilled in the art that other compounds and reaction procedures can be used to prepare the novel dyes of general formula (1).

The metal complexes of the dyes of general formula (1) can be prepared by known methods from the ortho, ortho' dihydroxyazo dye or the reactive equivalent thereof; e.g. o-alkoxy-o'-hydroxyazo dyes or by treating an o'hydroxyazo dye, which contains a hydrogen atom in the ortho position to the azo group, with a metal and an oxidizing agent such as hydrogen peroxide in a weakly acid solution. U.S. Pat. No. 4,400,317 for instance describes a method of preparing the metal complex by treatment with non-salt forming metals. The metal complexes dyes of the inventor may contain one complexed metal atom to one dye molecule or one metal atom to two dye molecules. In the case of chromium or cobalt complexes the ratio of metal atoms to dye molecules is preferably 1:2 respectively and in the case of copper and nickel the ratio is 1:1 respectively.

The fiber-reactive, sulfonyl group X—$SO_2$— and Y—$SO_2$— are well known in the art. In practice the reactive moiety is either the vinyl sulfonyl group or a moiety that can be converted to vinyl sulfonyl by treatment with an alkaline agent. Preferably, the fiber-reactive sulfonyl group is the beta-sulfatoethyl-sulfone ester. More preferably, it has been found that the fiber-reactive, sulfonyl groups have different reactivity e.g. X—$SO_2$— being the sulfatoethylsulfonyl moiety and Y—$SO_2$ being the beta-chloroethylsulfonyl moiety.

The azo compounds of this invention can be used in the form of their free acids as well as in the form of their salts. They are preferably used in the form of salts, preferably the alkali metal salts, for coloring (dyeing and printing) materials, in particular fiberous materials containing hydroxy groups and/or amino groups. In addition, the compounds of this invention show surprisingly superior color fixation properties even if fiber-reactive moiety is prematurely converted to the vinyl moiety in the commercial dyeing operation and they are particularly resistant to hydrolysis in the chemical-pad-steam (C.P.S.).

The present invention is directed to the novel compounds according to the general formula (1), and the process for the manufacture and use of these compounds. The process according to the invention comprises the coupling a compound of the formula (3):

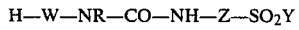
H—W—NR—CO—NH—Z—$SO_2$Y with a diazotized amino compound of the general formula (2):
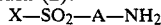
X—$SO_2$—A—$NH_2$ according to known procedures for the coupling of a naphthalene or phenyl compound with a diazotized aminonaphthalene or aniline. The coupling reaction according to the invention can be carried out under conventional conditions for the preparation of fiber-reactive, azo compounds; in particular in an aqueous medium and at a temperature, between 0° and 50° C., preferably between 5° and 20° C., and at a pH-value between 2 and 8, preferably between 4 and 7.

The compounds of formula (1) can be separated from the reaction medium after their preparation, by known methods suitable for water-soluble compounds, such as, by precipitation from the reaction medium with electrolytes, such as, sodium chloride or potassium chloride, or by evaporation of the reaction medium, for example by spray-drying. When the latter method for isolation is chosen, it can be advantageous to remove sulfates if they are present in the synthesis solutions, before evaporation. This can be done by precipitation of the sulfates as calcium sulfate and filtration. In some cases, it is also possible for the solutions obtained in the synthesis to be used directly, after standardization with water, as a liquid dyestuff composition. These liquid dyestuff compositions, especially useful in chemical-pad-steam applications, show no chemical of physical changes on long term storage.

The compounds according to formula (1) are suitable, as water-soluble dyestuffs, for coloring (dyeing and printing) of fibers, leather or other materials containing hydroxy groups and/or amino groups. Exemplary materials are natural, regenerated or synthetic, nitrogen-containing fibers and natural, regenerated or synthetic hydroxy group containing fibers. The dyestuffs according to the invention are capable of coloring these materials to deep, brilliant shades ranging from golden yellow to blue with superior fastness properties. The fiber-reactive groups in the compounds of the invention can react with the $NH_2$- and OH- groups of the material, such as a cotton containing hydroxy groups, to form a covalent bond and thus form a bonded links with the fiber.

The present invention also relates to the use of the compounds of formula (1) for coloring (such as dyeing and printing) such materials and to a process for coloring such materials. This process which comprises contacting a compound of formula (1), preferably in the form of an aqueous solution with the material and fixing the compound of formula (1) on it optionally under the action of an alkaline agent and/or heat.

Typical nitrogen-containing synthetic materials useful in this invention are polyurethanes and polyamides such as nylon 6, nylon 6/6 and nylon 11. Typical natural polyamide materials are silk and wool and other animal hair products. Typical materials containing hydroxy groups are polyvinyl alcohols, cellulosic materials such as cotton, other vegetable fibers, such as linen, hemp, jute, and their regenerated products, such as viscose rayon or cuprammonium rayon.

The novel compounds of formula (1) can be applied by the known application techniques for fiber-reactive dyestuffs. In general, a procedure is followed in which an aqueous solution of the compounds of the formula (1) or their metal complex are applied to the materials, optionally in the presence of a thickener and/or other auxiliaries to improve the affinity, leveling and migration properties. After application the dyestuff is then fixed to the fiber.

The compounds of the formula (1) are applied to natural or regenerated or synthetic polyamide fibers or polyurethane fibers or to leather by conventional techniques from an aqueous acid to aqueous neutral solution (pH range from about 3 to 6.5), usually by the exhaustion method, and are fixed on these fibers by the application of heat at a temperature between 60° and 130° C. It is possible for example to add acetic acid or acetic and ammonium acetate as a buffer to the bath containing the compound of the general formula (1) in order to obtain the desired pH value. Addition of leveling agents, for example those based on a reaction product of cyanuric chloride with three moles of an aminobenzenesulfonic acid and/or an amino-naphthalenesulfonic acid or those based on a reaction product of stearylamine and ethylene oxide, can be used for the purpose of achieving level dyeings. The compounds of formula (1) can be applied and fixed on the material by the exhaustion process either at the boiling point or at a higher temperature, for example, at 105° to 120° C., under pressure. It is expedient for the dyeing to be started with a slow increase in temperature to 60° C. and, after some time, for the temperature to be increased slowly to a higher temperature.

In the coloring of fiber materials containing hydroxy groups, the compound of formula (1) is generally applied to the fiber from a weakly acid to alkaline solution and fixed on the fiber by an alkaline agent subsequently added to the dye bath or applied directly to the fiber. Typical alkaline substances which can be used in these fixing solutions are sodium hydroxide, sodium carbonate, sodium bicarbonate, potassium hydroxide, potassium carbonate, trisodium phosphate or sodium or potassium silicate or waterglass. The dyestuffs can be applied by exhaustion dyeing procedures or the chemical pad steam (C.P.S.) process. In the exhaust method, the fiber material is treated in an aqueous-alkaline solution of the compound of the formula (1), preferably in the presence of an electrolyte, such as sodium chloride or sodium sulfate, at an elevated temperature between 30° and 130° C. It is preferably for the dyeing to be started at a low temperature and for the temperature of the exhaustion bath to be slowly increased to about 60° C. − 130° C., and completing the fixation step in this temperature range.

In the chemical-pad-steam (C.P.S.) method, the fabric is continuously passed through a dyebath, dried passed through an alkaline chemical pad, fixed by steaming, washed and dried. Fiber reactive dyes of formula (1) perform excellently in this application. The new dyes exhibit excellent fixation, thereby reducing waste and waste treatment. They are less susceptible to hydrolysis during steam than dyes containing one sulfonyl reactive group. The new dyes of formula (1) are less sensitive to alkali variations, particularly increasing alkali, in the chemical pad when compared to dyes containing one sulfonyl reactive group. Liquid dyestuff compositions, preferred by dyehouses using C.P.S., exhibit improved chemical stability on storage when compared to dyes containing a monochlorotriazine group. The monochlorotriazine group hydrolyzes at pH 2.5–4.5, and rapidly below pH 3, thus requiring large amounts of buffer to absorb the acidity generated. Dyes of formula (1) are stable at 2.5–4.5. At high pH, the dyes of formula (1) vinylize, but surprisingly no loss of color strength in C.P.S. dyeing is observed.

If the compounds of formula (1) are applied to the fiber material in the form of printing pastes, it is usual to employ thickeners, such as sodium alginate, cellulose ether, tragacanth or gum arabic, optionally with the addition of a printing auxiliary and an alkaline compound. These prints are then treated with hot air at a temperature between 70° and 230° C., preferably between 100° and 150° C. (thermofixed), or steamed. The compounds of formula (1) can be applied to the fiber by customary printing processes such as a one-step procedure using a printing paste of the dyestuff containing sodium bicarbonate or one of the other alkaline agents with subsequent fixation of the compound of the formula (1) by steaming at 101° to 103° C. They also can be applied to the fiber by a two-step process of applying a neutral or weakly acid printing paste of the dyestuff and then fixing it either by passing the printed material through a hot alkaline bath containing electrolytes. Alternatively, it can be overpadded with an alkaline liquour containing electrolytes and left to stand at room temperature but usually it is treated with heat using hot steam or hot air. If an electrolyte-containing alkaline bath is used for fixing, the bath temperature is 60° to 105° C., so that subsequent treatment by hot air or steam can be eliminated.

If the material is impregnated with the compound of the invention and treated with a strong aqueous alkali, (e.g. sodium hydroxide or potassium hydroxide and/or sodium silicate or potassium silicate or trisodium phosphate) it is sufficient for the moist goods (usually prints) to be left to stand at room temperature for a relatively long period to fix the dyestuff. The colored materials thus obtained are then after-treated, rinsed and dried, in the usual manner.

Colored fiber materials on which the compounds of the invention have been fixed, have very good wet fastness properties. They show strong, shades from golden yellow to blue, outstanding wet fastness properties, in particular, fastness to washing at 60° to 95° C., to alkaline and acid perspiration, to water and to bleaching with sodium chlorite and chlorinated water. In particular, they have, in the dry and moist state, good fastness to light. The compounds of formula (1) have a very good affinity and exhibit a high degree of fixation (high tinctorial strength). They fix on mixed fiber materials (e.g. cotton/viscose staple mixed fabric) in the same intensity and produce uniform shade and depth of color on such mixed fiber materials.

The following examples illustrate the invention. The parts and percentages are by weight unless otherwise indicated.

EXAMPLES

Example 1:

85.25 parts of 1-amino-8-hydroxynaphthalene-3,6-disulfonic acid, monosodium salt are added to 1,050 parts water and the pH adjusted to pH 7 with sodium carbonate to give a solution. A solution of 100 parts 3-(beta-chloroethylsulfonyl)-phenyl-1-isocyanate in 500 parts chlorobenzene is added at room temperature. The pH is allowed to drop to pH 5 and is held at pH 5–6 for 24 hours. The mixture is then heated to 45° C., 25 parts of diamataceous earth (Celite) added and it is filtered. The chlorobenzene layer is allowed to separate and is drawn off. The aqueous layer is then treated with 225 parts sodium chloride, the precipitate is filtered with suction and dried to give 139 parts of coupling component which in the free-acid form corresponds to the following formula:

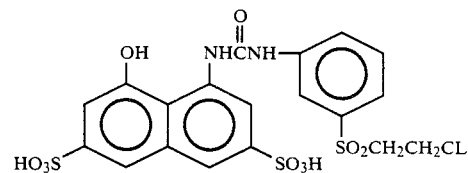

Example 2:

In the procedure of Example 1, prior to treatment with sodium chloride, sodium carbonate is added to pH 8.5 and the solution is heated at 55°–60° C. until there is no further change in pH. The solution is acidified with hydrochloric acid to pH 5 and treated with 225 parts of sodium chloride. The precipitate is filtered and dried to give a coupling component, which, in the free-acid form, corresponds to the following formula:

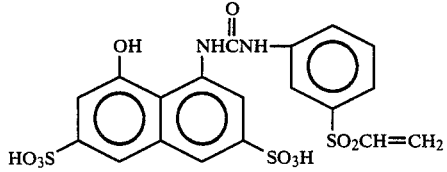

Example 3:

17.0 parts 1-amino-8-hydroxynaphthalene-3,6-disulfonic acid monosodium salt are dissolved in 200 parts of water and neutralized with sodium carbonate to give a solution. 30.00 parts of pulverized N-[4-(beta-sulfatoethylsulfonyl)-phenyl]]-1-carbamic acid phenyl ester (obtained by condensation of chloroformic acid phenyl ester with 4-amino phenyl-1-beta-sulfatoethylsulfone) are added to the above solution at 50°-60° C. at a pH value of 6–7 with vigorous stirring. Completion of the reaction is determined by thin layer chromatography. The solution is diluted with 100 parts of water, filtered and treated with sodium chloride. The precipitate is filtered, washed with sodium chloride solution and dried to give a coupling component, which in the free-acid form corresponds to the following formula:

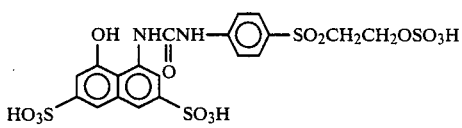

EXAMPLE 4:

85.25 parts of 1-amino-8-hydroxynaphthalene-4,6-disulfonic acid monosodium salt are treated as in Example 1 to give a coupling component, which in the free-acid form corresponds to the following formula:

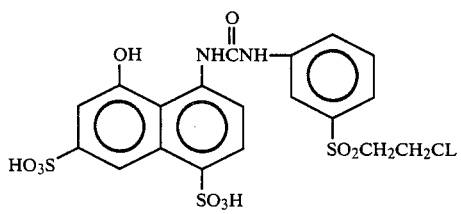

EXAMPLE 5:

59.7 parts of 2-amino-8-hydroxy naphthalene-6-sulfonic acid are neutralized to pH 6 with lithium hydroxide and treated as in Example 1 to give a coupling component, which in the free-acid form corresponds to the following formula:

Example 6:

59.7 parts of 3-amino-8-hydroxynaphthalene-6-sulfonic acid are treated as in Example 5 to give a coupling component, which in the free-acid form corresponds to the following formula:

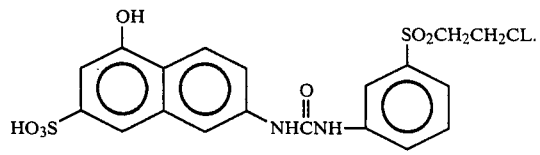

Example 7:

68.2 parts 1-amino-2,5-dimethoxyphenyl-4-(beta-sulfatoethyl-sulfone) in 300 parts of water is neutralized to pH 6 with sodium carbonate. The solution is clarified and reprecipitated with 28 parts sulfuric acid. 34 parts of 40% sodium nitrite is introduced at 0°-5° C. to diazotize the amine and then to the diazonium salt suspension is added to solution of 107 parts of the coupler from Exampler 1 in 930 parts water and the pH is adjusted to 5.3 with sodium carbonate to yield the dyestuff which in the free-acid form corresponds to the following formula:

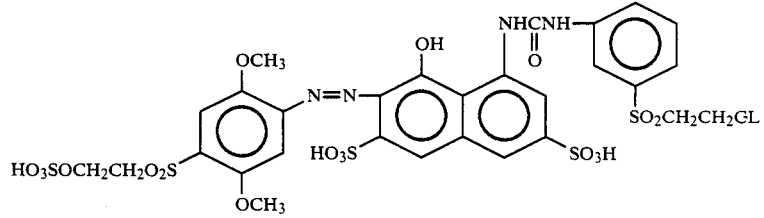

The above dyestuff may be left as a solution, precipitated with sodium chloride or evaporated to dryness and it gives a violet shade on cotton. A solution of the above dyestuff showed no chemical or physical changes on storage for 10 months at about pH 4.5.

Example 8:

15.5 parts 1-amino-2-methoxyphenyl-5-(beta-sulfatoethylsulfone) in 100 parts of water is cooled with 100 parts of ice. 5 parts of sulfuric acid is added followed by 9.0 parts of 40% sodium nitrite solution. To the diazonium salt slurry is added a solution of 24.2 parts coupler from Example 6 dissolved in 520 parts of water and the pH is adjusted to pH 6 to give the dyestuff which in the free acid form corresponds to the following formula:

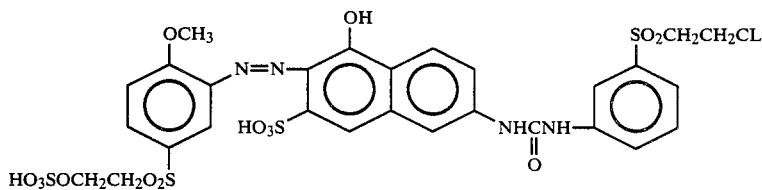

The dyestuff is dried and gives on cotton an orange shade.

Example 9:

16.4 parts 2-amino-6-(beta-sulfatoethylsulfonyl)-naphthalene-1-sulfonic acid is slurried in 120 parts of water and cooled to 5° C. 7.5 parts 40% sodium nitrite solution is added to diazotize the amine. The diazonium salt slurry is added to a solution of 19.4 parts coupler from Example 5 in 240 parts of water while holding the pH at pH 5 to 6 with sodium acetate and sodium carbonate. The resulting dyestuff which in the free acid form corresponds to the following formula:

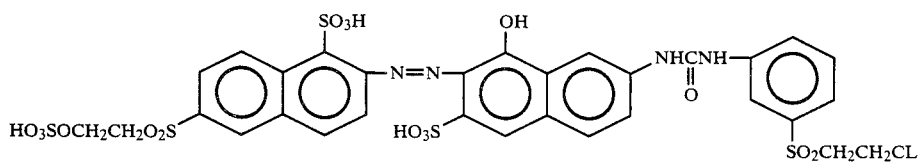

is dried and gives on cotton a red shade.

Example 10:

37.8 parts 2-amino-8-(beta-sulfato ethyl sulfonyl)-naphthalene-6-sulfonic acid in 200 parts of water and 100 parts of ice is diazotized with 15.9 parts of 40% sodium nitrate solution. The diazonium salt suspension is then added to a solution of 60.0 parts coupler from Example 1 in 430 parts of water and the pH is adjusted to 5.3 with sodium carbonate. When the coupling is complete, 25.7 parts of copper sulfate pentahydrate is added and the solution is heated to 57°-60° C. 220 parts of 10% hydrogen peroxide solution is dripped in at 55°-60° and pH 4.7-5.0 to form the dyestuff which in the free acid form corresponds to the following formula:

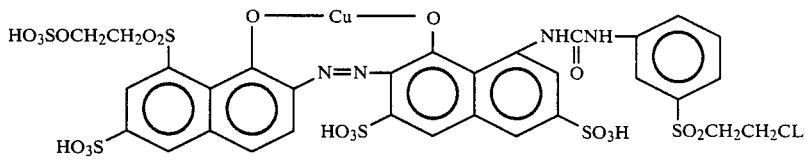

which is isolated by salting with 190 parts potassium chloride filtered and dried. The dyestuff gives on cotton a blue shade.

Example 11:

26.0 parts 2-amino phenol-4-beta-(hydroxyethyl)-sulfone is esterified overnight in 80 parts of 100% sulfuric acid then drowned in ice and water. 22.5 parts of 40% sodium nitrite solution is added dropwise to diazotize the amine and the pH is adusted to 5.5 with sodium carbonate. 67.8 parts coupler from Example 1 dissolved in 560 parts water is mixed with the diazonium salt slurry and the pH is adjusted to pH 6.8 with sodium carbonate. When the coupling is complete, 25 parts of copper sulfate pentahydrate is added and the pH adjusted to 5.0 with sodium carbonate to give the dyestuff which in the free acid form corresponds to the following formula:

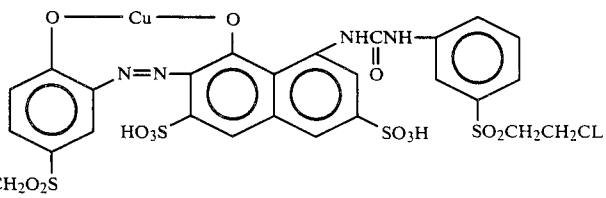

The dyestuff is isolated by drying and give on cotton fabric a violet shade.

ADDITIONAL EXAMPLES

| No. | Coupling Component | Diazo component | Color |
|---|---|---|---|
| 12 | 1-hydroxy-8-(3-(2-chloroethylsulfonyl)phenylureido)naphthalene-3,6-disulfonic acid (OH, NHCNHC₆H₄-SO₂CH₂CH₂Cl; HO₃S, SO₃H on naphthalene) | 4-(2-sulfatoethylsulfonyl)aniline (HO₃SOCH₂CH₂O₂S–C₆H₄–NH₂) | Red |
| 13 | " | 2-amino-4-(2-sulfatoethylsulfonyl)anisole (OCH₃, NH₂; HO₃SOCH₂CH₂O₂S) | Blue Red |
| 14 | " | 2-amino-5-methoxy-4-(2-sulfatoethylsulfonyl)toluene (OCH₃, NH₂, CH₃; HO₃SOCH₂CH₂O₂S) | Blue Red |
| 15 | " | 2-amino-1,3-dimethyl-5-(2-sulfatoethylsulfonyl)benzene (CH₃, NH₂, CH₃; HO₃SOCH₂CH₂O₂S) | Red |
| 16 | " | 3-(2-sulfatoethylsulfonyl)aniline (NH₂; HO₃SOCH₂CH₂O₂S) | Red |
| 17 | " | 2-amino-1-sulfo-4-(2-sulfatoethylsulfonyl)benzene (SO₃H, NH₂; HO₃SOCH₂CH₂O₂S) | Red |
| 18 | " | 2-amino-1-carboxy-4-(2-sulfatoethylsulfonyl)benzene (COOH, NH₂; HO₃SOCH₂CH₂O₂S) | Red |
| 19 | " | 2-amino-1-hydroxy-4-(2-sulfatoethylsulfonyl)benzene (OH, NH₂; HO₃SOCH₂CH₂O₂S) | |
| | | 1:1 Cu Complex | Bluish Violet |
| | | 1:2 Co Complex | Navy Blue |
| 20 | 1-hydroxy-8-(3-(2-chloroethylsulfonyl)phenylureido)naphthalene-3,6-disulfonic acid (OH, NHCNHC₆H₄-SO₂CH₂CH₂Cl; HO₃S, SO₃H) | 2-amino-1-hydroxy-4-(2-sulfatoethylsulfonyl)benzene (OH, NH₂; HO₃SOCH₂CH₂O₂S) | |
| | | 1:1 Copper Complex | Reddish Violet |
| | | 1:2 Cobalt Complex | Bluish Violet |
| | | 1:2 Cr Complex | Greenish Navy Blue |
| 21 | " | 2-amino-1-(2-chloroethylsulfonyl)benzene (ClCH₂CH₂SO₂; NH₂) | Red |
| 22 | " | 2-amino-1-sulfo-6-(2-sulfatoethylsulfonyl)naphthalene (SO₃H, NH₂; HO₃SOCH₂CH₂O₂S) | Red |

-continued
ADDITIONAL EXAMPLES
| No. | Coupling Component | Diazo component | Color |
|---|---|---|---|
| 23 | " | 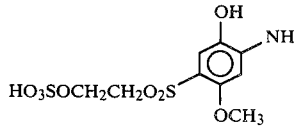 1:1 Cu Complex | Reddish Blue |
| 24 | 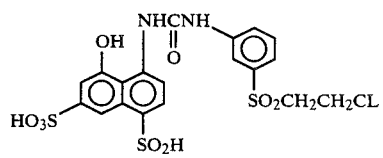 | 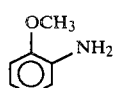 | Red |
| 25 | " | 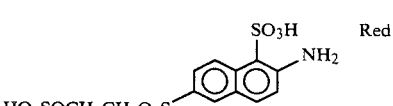 | Red |
| 26 | 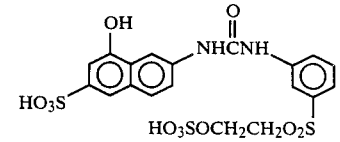 | 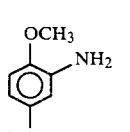 | Scarlet |
| 27 | 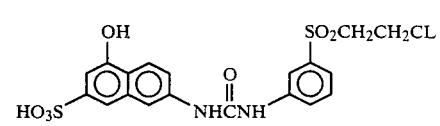 | 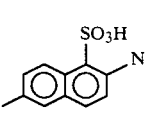 | Orange |
| 28 | 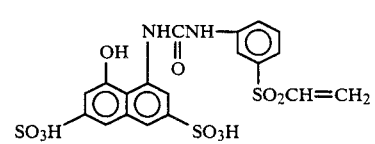 | 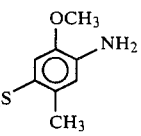 | Bluish Red |
| 29 | " | 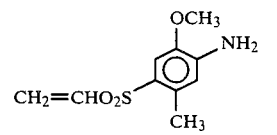 | Bluish Red |
| 30 | 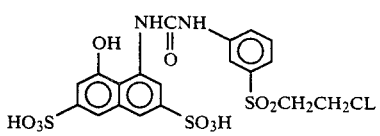 | 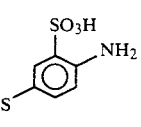 | Red |
| 31 | 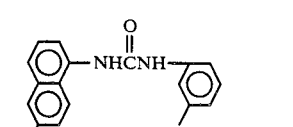 | 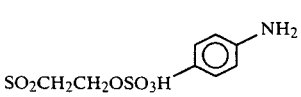 | Reddish Orange |
| 32 | 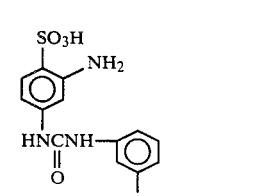 |  | Golden Yellow |

ADDITIONAL EXAMPLES

| No. | Coupling Component | Diazo component | Color |
|---|---|---|---|
| 33 | (structure with NCNH, Cl, SO2CH2CH2Cl) | (structure with NH2, SO2CH2CH2OSO3H) | Golden Yellow |

Example 34

The following example was conducted to illustrate the ability of the dyes of this invention to resist color yield loss with increasing dye bath temperature. The compounds tested were:

Compound A—The dye of Example 13.
Compound B—The dye of Example 22.

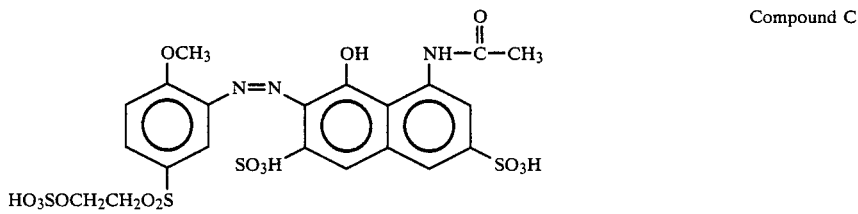

Compound C

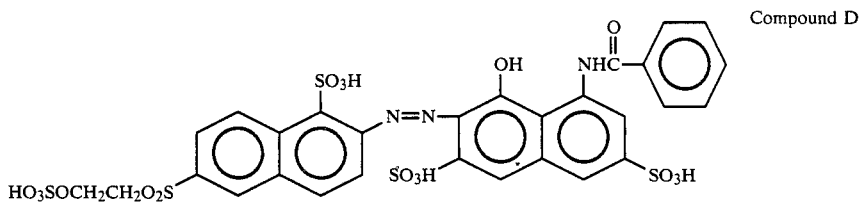

Compound D

Dye bath solutions at nominal concentrations of 1 to 9 percent dye were prepared and dyeing were made on test specimens at 40°, 60°, and 80° C. by the exhaust dyeing procedure; the color yield on each dyeing was measured in CDU and the percentage color yield loss over the temperature range of 60°–80° C. calculated.

TABLE 1

| | % Color Yield Loss 60°–80° C. | | | |
|---|---|---|---|---|
| Nominal Dye | Invention | | Prior Art | |
| Concentration | A | B* | C* | D* |
| 1% | −17.0 | −11.4 | −34.1 | −36 |
| 3% | −17.0 | +3.0 | −32.3 | −28.7 |
| 5% | −11.0 | +14.2 | −29.1 | −31.3 |
| 7% | +0.5 | +5.0 | −24.0 | −24.8 |
| 9% | +3.0 | +25.6 | −26.5 | −23.4 |

*Average of two tests

The above data shows that the dyes of this invention exhibit lower color yield percentage loss with increasing dye bath temperature.

Example 35

Test specimens were dyed using compounds of the invention. The dyeings were made using the chemical pad steam procedure. The percentage of dye fixation was determined by measuring color yield of each specimen and calculating the percent dye fixed using the color yield of an unwashed dyed specimen as the 100% standard.

TABLE 2

| | Dyeing Concentration - % | | | | |
|---|---|---|---|---|---|
| | 1 | 2 | 4 | 6 | 8 |
| Compound | | | % Fixed | | |
| Ex 12 Dye | 101 | 92.1 | 102 | 92.5 | 84.9 |
| Ex 13 Dye | 89.6 | 82.9 | 97.7 | 96.0 | 85.2 |
| Ex 14 Dye | 89.4 | 93.6 | 83.5 | — | — |
| Ex 22 Dye | 92.7 | 96.3 | 94.1 | 96.0 | 92.5 |

Example 36

A steam hydrolysis test has been developed to measure the sensitivity of dyes to steam hydrolysis in chemical pad steam dyeing operations. The test measures the cleavage of dye-fiber bonds under adverse conditions that can be encountered in commercial dyeing operations (long steam time - high alkalinity).

The dyes were tested in two different dye bath solutions which were:

| Test Condition | #1 | #2 |
|---|---|---|
| Common Salt - g/l | 250 | 250 |
| Soda Ash - g/l | 20 | — |
| Caustic - 50% - g/l | 5 | 20 |
| Steam Time - min | 1 | 1,3,6 |

Fabric specimens dyes using the #1 test conditions (optimized conditions) were measured for color yield in color density units (CDU) and that value was used as the 100% standard. Test specimens were dyed using the #2 test conditions (adverse conditions) and their color yield in CDU were determined. The color yield attained for each dyeing as a percentage of the standard are reported in the table for the following dyes.

Test Dyes:

Dye 1 - Dye of Example 22 (the invention)

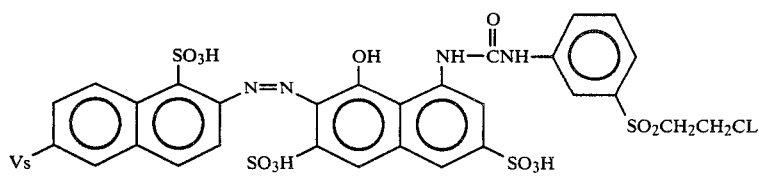

Dye 2 (chlorotriazine type)

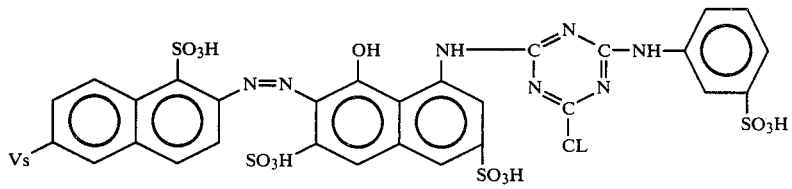

Dye 3 (single fiber-reactive group)

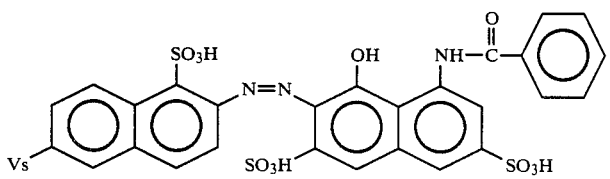

Dye 4 (single fiber-reactive group)

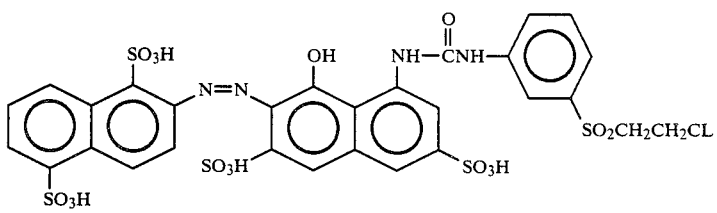

Vs = the beta sulfatoethylsulfonyl group

TABLE 3

| Dye | % Strength After Steaming | | |
|---|---|---|---|
| | 1 min | 3 min | 6 min |
| 1 (invention) | 93.7 | 70.82 | 34.0 |
| 2 (triazine) | 79.9 | 40.8 | 26.3 |
| 3 (single Vs) | 81.15 | 40.57 | 13.52 |
| 4 (single Vs) | 79.3 | 38.3 | 20.8 |

The above data shows that dyes of the invention have superior resistance to steam hydrolysis.

Example 37

The dyes of Example 36 were tested for sensitivity to alkali used in chemical-pad-steam dyeing. Experience has shown that certain dyes do not show sensitivity to alkali i.e. the dye's fixation does not vary appreciably with high alkalinity and such dyes give consistent dyeings even though the commercial dyeing conditions are not maintained in the optimum ranges. The percent fixation was measured relative to a standard unwashed color specimen. The results of this experiment are as follows:

TABLE 4

| Dye | Caustic Concentration in Dye Bath - g/l | | | | | | | Dye Type |
|---|---|---|---|---|---|---|---|---|
| | 3 | 6 | 9 | 12 | 15 | 18 | 21 | |
| 1 | 87.1 | 93.3 | 92.9 | 92.9 | 92.9 | 91.2 | 88.7 | invention |
| 2 | 76.9 | 86.6 | 80.9 | 79.1 | 82.7 | 81.5 | 79.5 | triazine |

TABLE 4-continued

| Dye | Caustic Concentration in Dye Bath - g/l | | | | | | | Dye Type |
|---|---|---|---|---|---|---|---|---|
| | 3 | 6 | 9 | 12 | 15 | 18 | 21 | |
| 3 | 80.0 | 85.0 | 85.7 | 84.0 | 82.8 | 75.6 | 69.8 | single Vs |

The above data demonstrates the superior resistance of the dyes of the invention to increasing alkalinity in the dye bath.

We claim:

1. A compound of the formula:

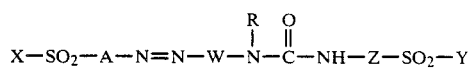

wherein:

X and Y are independently selected from $-CH=CH_2$, $-CH_2CH_2-S-SO_3H$, $-CH_2-CH_2Br$, $-CH_2CH_2OCOCH_3$, $-CH_2CH_2OH$, $-CH_2CH_2OPO_3H_2$, $-CH_2CH_2OSO_2CH_3$, $-CH_2CH_2-O-C_6H_5$, $-CH_2CH_2OSO_3H$, $-CH_2CH_2CL$, $-CH_2CH_2OSO_2-C_6H_5$ and $-CH_2CH_2-N-R_1R_2$;

R, R₁ and R₂ are independently selected from hydrogen, lower alkyl having one to four carbon atoms and sulfonated lower alkyl;

A is phenyl or naphthyl unsubstituted or substituted with substituents independently selected from hydroxy, halogen, lower alkyl, lower alkoxy, carboxylic acid and sulfonic acid;

W is phenyl or naphthyl unsubstituted or substituted with substitutents independently selected from sulfonic acid, amido, amino, lower alkyl, lower alkoxy, hydroxy, halogen; and Z is phenyl unsubstituted or substituted with lower alkyl and lower alkoxy.

2. The metal complexes of the compound of claim 1 wherein the metal is selected from copper, nickel, chromium and cobalt.

3. The compound of claim 1 wherein X is —CH₂CH₂OSO₃H and Y is —CH₂CH₂CL.

4. The compound according to claim 1 wherein X and Y are —CH=CH₂.

5. The compound according to claim 3 wherein R is hydrogen.

6. The compound according to claim 4 wherein R is hydrogen.

7. The compound according to claim 5 wherein A is phenyl unsubstituted or substituted with zero to two substituents independently selected from hydroxy, halogen, lower alkyl, lower alkoxy, carboxylic acid and sulfonic acid and W is phenyl unsubstituted or substituted with zero to two substituents independently selected from sulfonic acid, amido, amino, carboxylic acid, lower alkyl, lower alkoxy, hydroxy and halogen.

8. A compound according to claim 5 wherein A is phenyl unsubstituted or substituted with zero to two substituents independently selected hydroxy, halogen, lower alkyl, lower alkoxy, sulfonic acid and carboxylic acid and W is naphthyl unsubstituted or substituted with zero to three substituents independently selected from sulfonic acid, amido, amino, lower alkyl, lower alkoxy, hydroxy and halogen.

9. A compound according to claim 5 wherein A is naphthyl unsubstituted or substituted with zero to three substituents independently selected from hydroxy, halogen, lower alkyl, lower alkoxy, carboxylic acid and sulfonic acid and W is phenyl unsubstituted or substituted with zero to two substiuents independently selected from sulfonic acid, amido, amino, carboxylic acid, lower alkyl, lower alkoxy, hydroxy and halogen.

10. A compound according to claim 5 wherein A is naphthyl unsubstituted or substituted with zero to three substituents independently selected from hydroxy, halogen, lower alkyl, lower alkoxy, carboxylic acid and sulfonic acid and W is naphthyl unsubstituted or substituted with one to three substituents independently selected from sulfonic acid, amido, lower alkyl, carboxylic acid, lower alkoxy, hydroxy and halogen.

11. A metal complex according to claim 5, 6, 7, 8, 9, or 10 wherein the metal is selected from copper, nickel, chromium or cobalt.

12. A compound according to claim 1 having the formula:

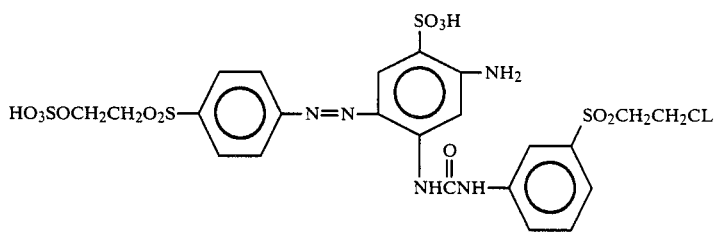

13. A compound according to claim 1 having the formula:

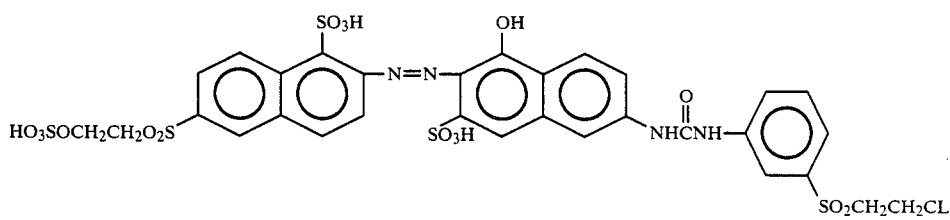

14. A compound according to claim 1 having the formula:

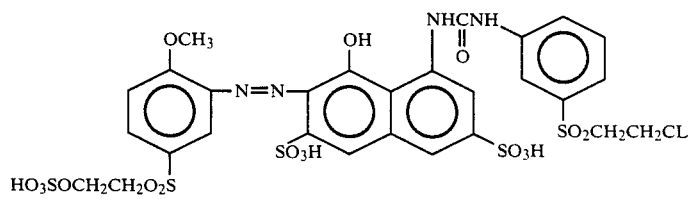

15. A compound according to claim 2 having the formula:

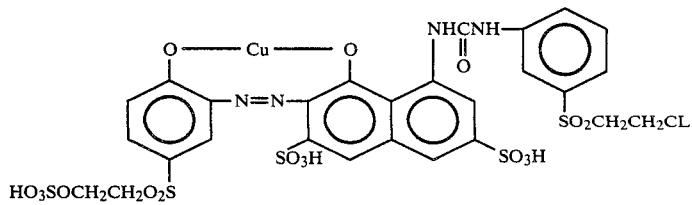
16. A compound according to claim 1 having the formula:
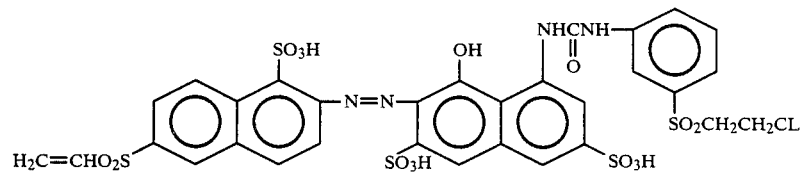
17. A compound according to claim 2 having the formula:
18. A compound according to claim 2 having the formula:
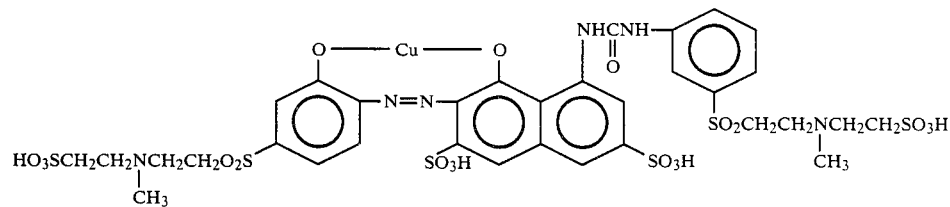
19. A compound according to claim 1 having the formula:
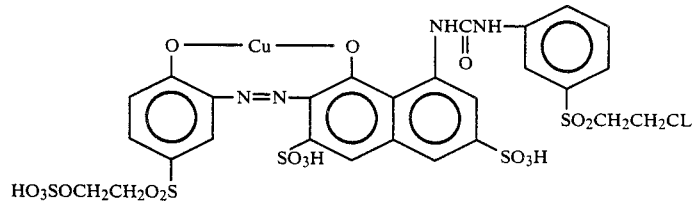
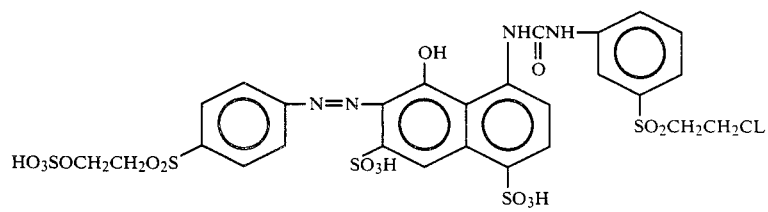
20. A compound according to claim 1 having the formula:

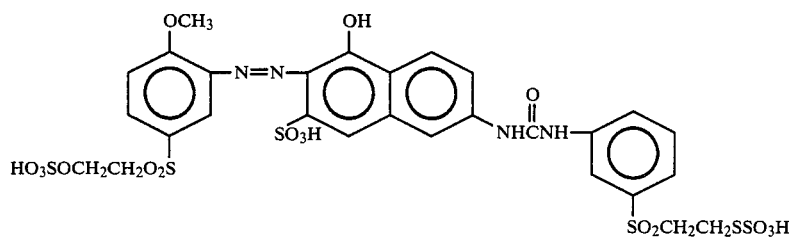
21. A compound according to claim 1 having the formula
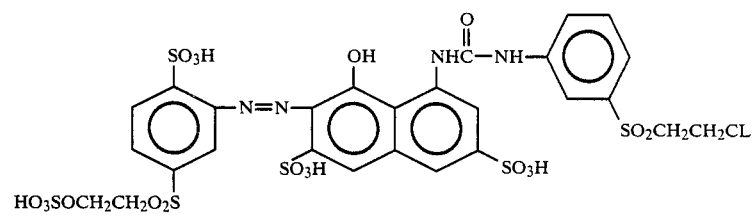
* * * * *

UNITED STATES PATENT AND TRADEMARK OFFICE
CERTIFICATE OF CORRECTION

PATENT NO. : 4,855,411

DATED : August 8, 1989

INVENTOR(S) : Glenn A. Thompson, et al

It is certified that error appears in the above-identified patent and that said Letters Patent is hereby corrected as shown below:

Column 1, line 32, The word "as" should read --are--.

Column 16, Examples 31 and 32:

The formula for the diazo component, the bond from the phenyl ring to the beta-sulfatoethylsulfonyl substituent should be from the phenyl ring to the sulfur atom of the sulfonyl moiety.

Column 18, Example 33:

The formula for the diazo component, the bond from the phenyl ring to the beta-sulfatoethylsulfonyl substituent should be from the phenyl ring to the sulfur atom of the sulfonyl moiety.

Signed and Sealed this

Thirty-first Day of July, 1990

*Attest:*

HARRY F. MANBECK, JR.

*Attesting Officer*    *Commissioner of Patents and Trademarks*